Aug. 30, 1966        M. J. LONG ETAL        3,270,202
LIQUID SCINTILLATION SPECTROMETER DETECTION CHAMBER
AND REMOVABLE TRAY FOR SUPPORTING
A PLURALITY OF SAMPLE CONTAINERS
Filed April 16, 1963        3 Sheets-Sheet 1
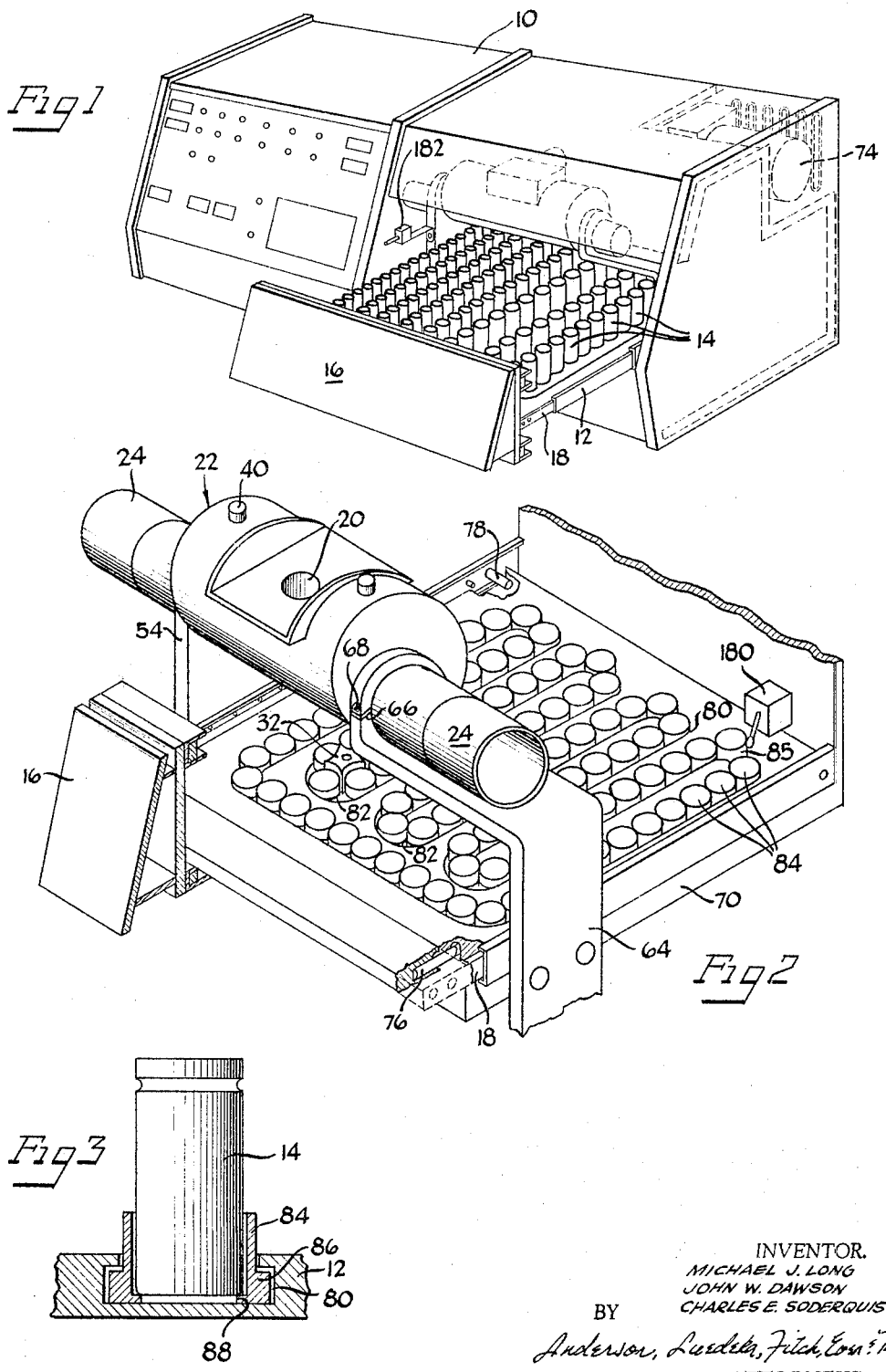
INVENTOR.
MICHAEL J. LONG
JOHN W. DAWSON
CHARLES E. SODERQUIST
BY
Anderson, Luedeka, Fitch, Even & Tabin
ATTORNEYS

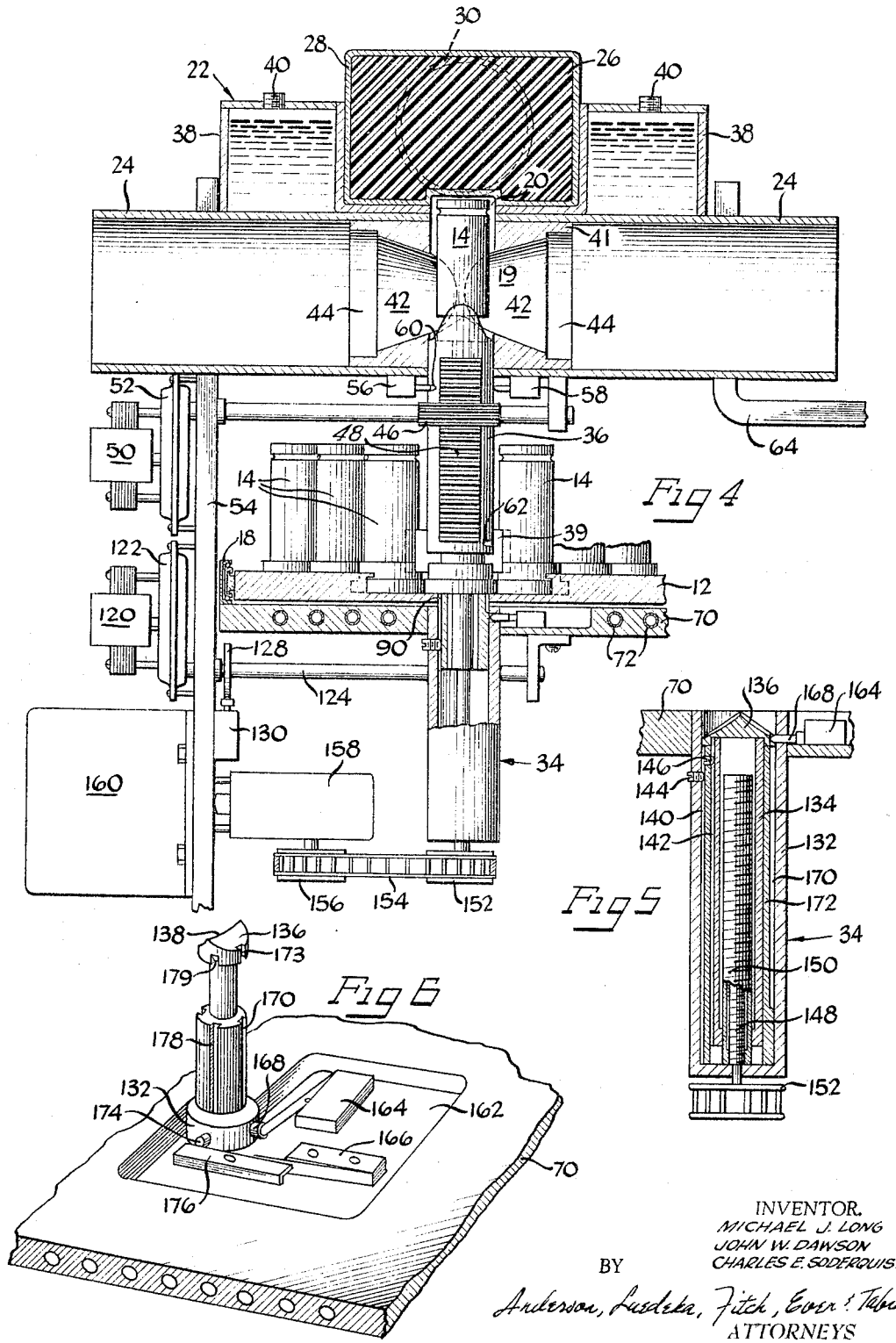

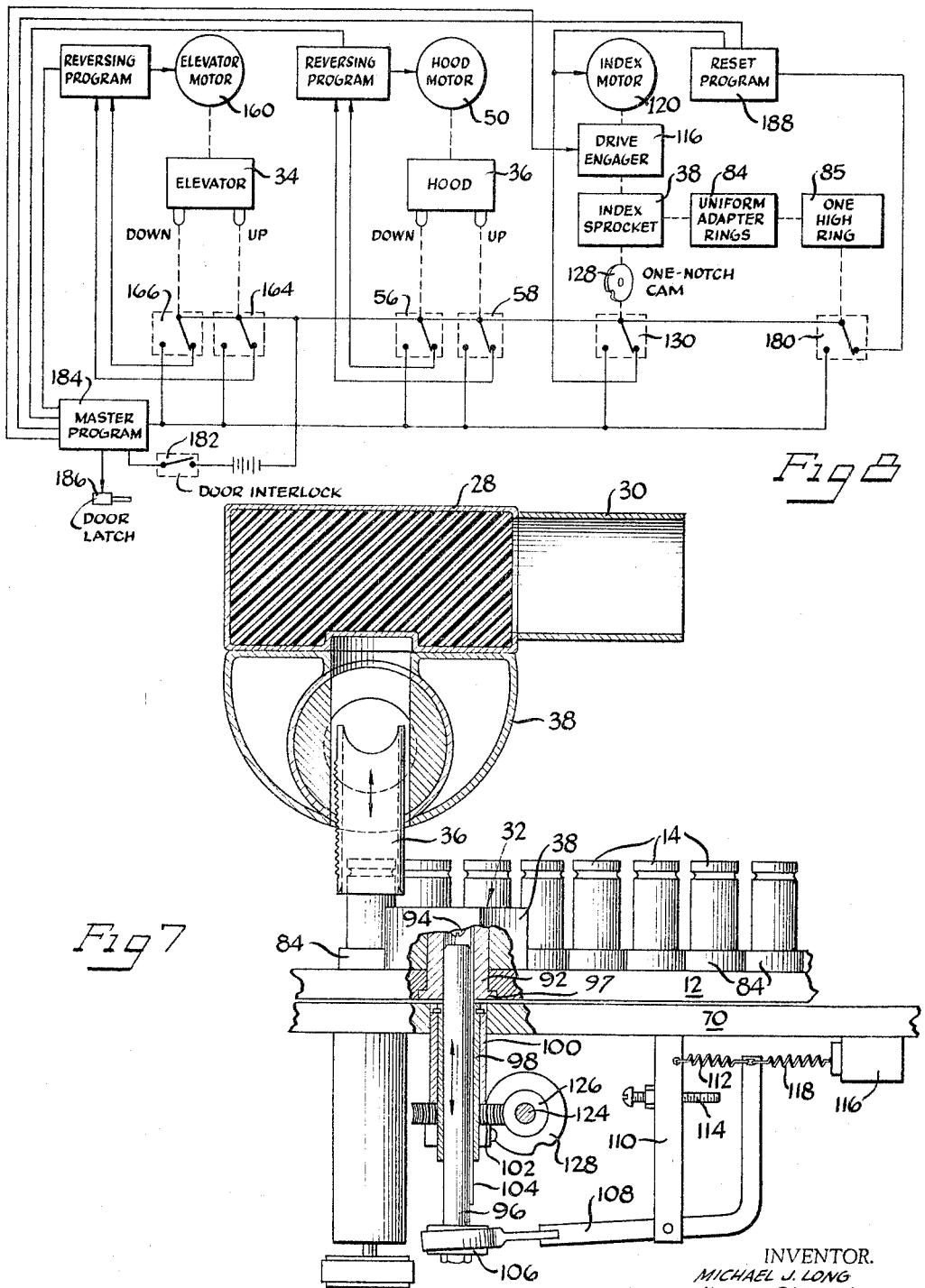

United States Patent Office 3,270,202
Patented August 30, 1966

3,270,202
LIQUID SCINTILLATION SPECTROMETER DETECTION CHAMBER AND REMOVABLE TRAY FOR SUPPORTING A PLURALITY OF SAMPLE CONTAINERS
Michael J. Long, Chicago, John W. Dawson, Clarendon Hills, and Charles E. Soderquist, Chicago, Ill., assignors to Vanguard Instrument Corporation, Berwyn, Ill., a corporation of Illinois
Filed Apr. 16, 1963, Ser. No. 273,500
3 Claims. (Cl. 250—71.5)

This invention relates to liquid scintillation spectrometers, and more particularly to a scintillation spectrometer which is particularly adapted for the indentification and evaluation of radioactivity in substances contained in a liquid scintillating medium.

To illustrate by reference to a typical application, for example in biochemical research, it is frequently of interest to determine the speed, efficacy or the nature of certain biological processes by introducing certain radioactively tagged substances into a biological system, and then systematically examining the tissue of selected organs to determine the presence, quantity, and the nature of the assimilation of the substance introduced. In such cases, sections are taken of the organs involved and suitably dissolved in appropriate solvents. A liquid scintillating medium, for example, a solution of diphenyloxozol in toluene, is added, and the sample thus prepared is analyzed for its radioactivity.

It is an object of the present invention to provide an improved mechanism for analyzing large members of such samples seriatim for determination of their radioactive content. It is a further object of the invention to provide an improved and simplified transfer mechanism in which individual samples are taken automatically, and in turn, from their common environment and inserted into a shielded, scintillation detection chamber under lighttight conditions and with a minimum of handling in a single operation. It is a further object of the invention to provide a scintillation detection apparatus in which an array of a substantial plurality of samples may be preassembled and introduced as a group into operative association with the detection apparatus, thereby to reduce the time involved in loading and unloading the samples to and from the detection apparatus, with the result that the utility of the apparatus is greatly increased. A further object of the invention is the provision of a scintillation detection chamber having improved shielding against incident light, and at the same time having an extremely simple and durable mechanism for introducing the samples one at a time, under shielded conditions, into the detection chamber.

Other objects of the invention will become clear and the invention better understood from the following description taken in conjunction with the accompanying drawings, in which:

FIGURE 1 is an isometric view of the housing of the apparatus in question with the sample entry door open to show the manner of introduction and the withdrawal of the samples into and from the apparatus, as well as indicating by dotted lines the relative positions of certain parts illustrated in detail in subsequent drawings;

FIGURE 2 is an isometric view of a portion of the apparatus taken from an upper forward quarter, showing a tray of sample containers inoperative position in the apparatus, and illustrating as well the trackage and propelling arrangement by means of which the samples are propelled about the tray so as to be tendered one-by-one for insertion into a surmounted detection chamber;

FIGURE 3 is a fragmentary sectional view of the tray, the track therein, and the adaptor ring in which each sample vial is carried;

FIGURE 4 is a frontal elevational view of the detection apparatus, partially broken away and partially sectioned to better show the relationship of parts, and likewise illustrating in part the manner in which the sample containers on the tray of FIGURES 1 and 2 are introduced one-by-one into a detection chamber for the scintillation evaluation of their radioactivity;

FIGURE 5 is an enlarged sectional elevation of the elevating mechanism which is shown in assembled relation with the overall apparatus in FIGURE 4;

FIGURE 6 is a much enlarged isometric view of the elevator mechanism in extended position, as when it supports a sample vial in the chamber;

FIGURE 7 is an end elevational view of the detection apparatus with certain parts sectioned and with certain parts broken away for a clear understanding of their operative relation to others, and with some parts omitted where their presence would tend to obscure the features particularly related by FIGURE 6;

FIGURE 8 is a circuit diagram in the form of logic rather than of circuitry detail, to explain in a general way the relation and sequence of functions of various components of the apparatus illustrated in the preceding drawings.

The apparatus herein disclosed and claimed is primarily the sample handling and presentation portion of an overall system of instrumentation which comprehends an improved photoelectric detection, data evaluation and storage system described and claimed in the co-pending application Serial No. 273,499 of John W. Dawson and Michael J. Long, two of the three inventors herein.

In general terms and referring for the present to FIGURES 1 to 4 of the drawings, the invention contemplates that the sample-handling portion of the apparatus be contained within a console or cabinet 10 in which a tray 12 of, say, 100 samples, each contained in a separate vial 14 and each suitably laced with a liquid scintillation medium, are introduced into the console 10 into operative position therein through a suitable opening in the console.

In the preferred embodiment illustrated, a front opening is provided and normally closed by a light-tight door 16 which when opened carries with it a tray-receiving rack 18, and which when closed places a tray of samples emplaced upon the rack into operative position from which the sample vials are displaced upwardly from the tray in sequence. The detection chamber 19 comprises essentially a well 20 in the center of a shield 22 of great mass into which extends a tubular channel 24 adapted to contain a pair of multiplier photo-tubes in opposed relation. The faces of the tubes are normally light shielded, but when operative are exposed to the sample vial within the well through passages of predetermined optical configuration.

Mounted on the top of the shield 22 and immediately above the sample-receiving well 20 is a block 26 of plastic luminophor material sheathed within a case 28 of stainless steel or the like adapted at the rear side thereof to receive, through a tubular channel 30, a third multiplier photo-tube.

When the tray 12 of samples is inserted into the console in proper position, as indicated in FIGURE 1, and the door 16 to the console is closed, a drive mechanism becomes engaged with an indexing device 32 on the tray, which, when appropriately and intermittently energized, propels the samples 14 one-by-one into position to be lifted from the tray into the detection chamber. An elevating mechanism 34 is located beneath the level of the removable tray 12 and passes upwardly through an aperture in the tray to lift each sample vial into the detection chamber. Associated with the detection chamber itself is an enshrouding sample hood 36 which is normally recessed within the well 20 but which, as each new sample is presented at the elevating station, travels downwardly from the chamber to surround the sample and to provide an uninterrupted channel to guide the sample into the chamber, at the same time providing a light seal for the chamber. Upon the completion of the examination of the sample, the elevating mechanism 34 descends, returning the sample to the tray, the hood 36 retracts into the detection chamber within the massive shield 22, and the indexing drive, which was coupled with the tray by the closing of the door, presents the next sample vial to the elevating station.

The sequence of operation involved in the examination of each sample vial is repeated until each sample on the tray has been examined as often as has been scheduled by the operator, whereupon the apparatus returns to "reset" condition. The door of the console is then opened, the tray removed and a similar tray of samples which have been awaiting examination is introduced into the machine.

Referring to FIGURES 2 to 7 for a more detailed description of the apparatus, it will be noted that the massive shield 22 in which the detection chamber 19 is located is essentially a cylindrical tank 38 which is adapted to be filled with mercury as the primary shielding medium. Threaded plugs 40 inserted into tapped openings on the upper side of the tank 38 near its ends provide ingress and egress for filling and emptying.

Extending through the shield tank eccentrically thereof is the smaller diameter tube 24 by means of which the tank 38 is supported, and which is adapted to receive into each of its ends one of a pair of multiplier photo-tubes which face each other at opposite sides of the central well 20 in the tube and shield. In its upper central portion, the shielding tank 38 is flattened, as shown particularly in FIGURE 2, to provide a mounting seat for the luminophor block 26, as shown in FIGURES 4 and 7. As already indicated, the tubular entry channel 30 of the casing 28 is adapted to contain a third multiplier photo-tube in optical proximity to the luminophor block for sensing cosmic radiation evidenced by scintillation within the luminophor block, for purposes more fully described in the aforementioned co-pending application, Serial No. 273,499.

In the center of the smaller tube 24 extending through the shielding tank 38, there is positioned an insert or plug 41 having bored therein the vertical radial cylindrical well 20 which extends from the upper surface of the flattened portion of the shielding tank 38 through the tube 24 and through the underside of the tank. The insert 41 is further milled axially from its ends to provide reducing conical chambers 42 which merge with each other within the central vertical bore and which themselves are counterbored to provide a short cylindrical section 44 concentric with, and of diameter slightly less than the inner diameter of the tube. The walls of the conical chambers 42 are preferably highly polished.

The short counterbores receive the front ends of the two opposed multiplier photo-tubes, which are inserted into the ends of the tube 24 from whose walls they are cushioned by a surrounding gasket or liner of felt or similar material of thickness slightly greater than the walls of the insert at the counterbores 44. Thus, when the two multiplier photo-tubes are installed in the tube 24, they face each other from opposite ends of the central insert 41, in position to view a sample vial 14 in the well 20 through the conical chambers 42 (FIG. 4).

Referring to FIGURES 4 and 7, the tubular sample hood 36 is slidably housed within the central well 20 of the detection chamber 19 and normally retracted therein to screen the faces of the multiplier photo-tubes. "Normally" in this instance refers to the idle condition of the apparatus, i.e., as when conditioned to receive an array of samples for examination.

The inner diameter of the sample hood 36 is such as to surround the sample vial 14 with a loose fit, so that, when the hood is extended downwardly to surround a sample vial presented at the elevating station, it serves to guide the subsequent upward travel of the vial into the detection chamber. To allow some tolerance in the placement of the sample at the elevating station, the bottom opening or mouth of the hood is preferably chamfered (FIG. 7) to center the vial within the hood. At its upper end the sample hood is scalloped or cut away at its sides (FIGS. 4 and 7) in approximate conformity with the conical bores 42 of the central insert 40 so as to cooperate with the conformation of the head of the elevating mechanism 34 to provide maximum transmission of light from the sample vial to the faces of the multiplier photo-tubes, in a manner later more fully described.

The sample hood is extended from and retracted into the detection chamber 19 by means of a small driving pinion 46 engaged with a rack 48 cut in the side of the hood. The pinion 46 is driven in turn by a small motor 50 through a transmission 52 mounted on one of the supports 54 for the massive shield 22, to propel the hood 36 up or down in the central well 20 according to the direction of rotation of the driving motor 50.

Referring particularly to FIGURE 4, it will be noted that a pair of microswitches 56 and 58 is mounted on the underside of the shield 22 in flanking relation to the sample hood 36. The operating plungers of these microswitches are biased against the sides of the hood so as to be received in opposed notches 60 and 62, one at the top of the extended portion of the hood and one at the bottom. Each of these microswitches is respectively connected in the holding circuit of a relay controlling the forward and reverse direction of operation of the pinion-driving motor 50, and serves to interrupt power when the sample hood 36 has been fully extended, or fully retracted, respectively.

As shown particularly in FIGURES 2 and 4, the shield, and with it the cosmic "umbrella," i.e., the luminophor block 26 and casing 28, the detection chamber 19, photo-multipliers and sample hood 36, are supported from the bottom of the enclosing cabinet 10 by means of two relatively heavy columns which are preferably fabricated from plate stock of aluminum or other suitably sturdy heat-conductive material. One of the columns, 54, is straight and vertical, whereas the other, 64, is offset laterally to provide through-passage for the tray 12 of samples beneath the shield 22, and to position the detection chamber well 20 over the elevating station and cooperating indexing mechanism of the tray. The upper end of each supporting column is bored to receive the tubular housing 24 upon its emergence from the shielding tank 38, and the ring thus formed is cut as at 66 and provided with a clamping screw 68 to tightly hold the shielding tank with the detection chamber well 20 in vertical alignment with the elevating mechanism 34.

Extending between the supporting columns 54 and 64, and firmly secured in bracing and heat-conductive relation thereto, is a refrigerated base platen 70 which underlies the tray 12 of samples positioned in the apparatus. The platen 70 is preferably of good heat-conductive quality such as, for example, aluminum, having cast therein a network of tubular channels 72 which may be of stainless steel tubing. The network within the platen is coupled by suitable conduit (not shown) with a refrigerant compressor 74 (both indicated in dotted outline in FIGURE 1) so that refrigerant is expanded within the coil system in the base platen. The portion of the cabinet or console which contains the detector chamber, the samples, and all of the operating mechanism illustrated in FIGURES 2 to 7 inclusive, is thermally insulated and thermostatically controlled to maintain an equalibrium temperature under operating conditions at approximately zero degrees centigrade.

The sample tray 12, when placed in operative position in the apparatus, closely overlies the base platen 70 so as to maintain therewith as favorable a heat transfer relation as is consistent with clearance necessary to permit movement of the tray into and out of the apparatus.

The tray is supported at its side edges by the extensible telescopic rack 18, being placed thereon when the slide is extended to a position forwardly of the console by the opening of the door, and then moved backwardly into operative position in the console, as illustrated by solid lines in FIGURE 2. The tray is supported by pegs on the rack which are received in seats or tunnels formed on the underside of the tray (FIG. 2). Pegs 76 in the forward cross bar of the rack 18 position the tray sidewardly, and pegs 78 extending inwardly from the side bars of the rack position the tray longitudinally on the rack.

The tray 12 is preferably of a rigid, light-weight heat-conductive material such as magnesium, and has milled therein from its upper side a continuous but folded track 80 (FIG. 2) which skirts the front and side edges of the tray, and is provided with a number of re-entrant or folded portions 82 which extend into the body of the tray from the rearward side. As shown in FIGURE 3, the track is of T-shaped cross-section, i.e., in the form of a flat groove having undercut side edges so as to receive and hold therein a plurality of adaptor rings 84, illustrated as 100 in number, which fill the track.

Each adaptor ring 84 (FIG. 3) is a stainless steel sleeve adapted to hold one sample vial 14 in upright position. At its lower end is a flange 86 which provides a shoulder for interlocking engagement with the overhanging side edge of the track. An inwardly-extending bottom flange or lip 88 supports the sample vial, enabling the ring to carry the vial through the track with its bottom surface elevated slightly from the floor of the track.

After the forward end of the first or lefthandmost re-entrant portion 82 of the track as seen in FIGURE 2, is the sample propelling mechanism 38, a cam or sprocket, illustrated as having five lobes or points, which engages the adaptor rings 84 much as does the sprocket of a roller chain. When positioned as shown in FIGURE 2, i.e., with one of the adaptor rings 84 at the forwardmost point of the re-entrant track portion, the sample vial within that ring is positioned immediately below and in vertical alignment with the well 20 of the detection chamber 19. At this very point, there is also provided in the tray an aperture 90 which extends from the bottom of the tray to the floor of the track. This aperture has a diameter slightly smaller than the inner diameter of the inner lip 88 of the adaptor rings 84, i.e., than the outside diameter of the vial. Located immediately below the aperture 90, and similarly in axial alignment therewith, is the elevator mechanism 34 which will later be described in detail but which, for the present, may be simply said to lift the vial 14 from the adaptor ring 84, carrying the same upwardly through the extended hood 36 and into the well 20 of the detection chamber 19.

Referring to FIGURE 7, it will be noted that the cam or sprocket 38 which propels the adaptor rings 84, and with them the sample vials 14 about the tray, is mounted in the tray and therefore removable from the apparatus upon the withdrawal of the tray. The sprocket 38 is slidably interfitted with a bored spindle 92 and secured thereto by a set screw 94. The spindle 92 is journalled in the tray and has a flange 95 at its lower end which is received in a counterbored portion of the journal, so that when the sprocket is assembled with the spindle, the tray itself resists any thrust tending to displace the sprocket vertically.

When the tray is fully emplaced within the housing, the hollow spindle 92 of the sprocket 38 overlies the drive shaft 96 of an indexing drive which, when engaged with the sprocket 38 and rotated, propels the rings 84 through the track. The indexing drive likewise comprises a hollow spindle 98 which is rotatedly journalled in a sleeve 100 secured in the base platen, being suspended in the sleeve by a snap ring at its upper end. The spindle 98 is provided, beneath the sleeve bearing 100, with a worm gear 102 suitably secured thereto. Vertically reciprocable within the hollow drive spindle 98 is the shaft 96, which is secured in driving relation with the spindle by a long bar key 104. At its lower end, the shaft is seated in the inner race of a universal ball thrust bearing 106, the outer race of which is secured to the end of a lever 108 pivoted to a bracket 110 on the underside of the base platen 70. A tension spring 112 extending between the other end of the lever 108 and the bracket 110 normally maintains the lever against a stop post 114 to retract the shaft 96 into the spindle 98, but a solenoid 116, connected to the lever 108 through an opposing spring 118, rocks the lever 108 when energized and raises the shaft 96 upwardly through its hollow spindle.

As indicated in FIGURE 7, the shaft 96 when elevated seeks the bore in the hollow spindle 92 of the drive sprocket 38 on the tray, the two being dimensioned for a loose sliding fit and having their initially mating ends chamfered so as to "drift" the tray in the event of any slight misalignment. The spindle 92 of the sprocket is provided with a keyway to receive the bar key 104 on the shaft, which, when the engaging solenoid 116 is energized, rotates ineffectively at the entry to the bore of the spindle 92 until the bar key becomes aligned with the keyway, permitting the shaft 96 to rise into driving engagement.

Power for the indexing drive is provided by a small motor 120 (FIG. 4) which is geared down through a suitable transmission 122 to an output shaft 124 having thereon a worm 126 (FIG. 7) meshed with the worm gear 102 on the drive spindle 98. Also carried on the worm shaft 124 is a one-notch cam 128 (FIG. 7) engaged by the follower of a micro-switch 130 (FIG. 4) which is located in the holding circuit of the relay through which power is applied to the driving motor 120, and which normally serves to time the motor out of operation after one complete rotation of the worm. The ratio between the worm and the worm gear on the drive spindle is such that one revolution of the worm produces one-fifth of a revolution of the propelling sprocket 38, and thus replaces one sample vial with the next in sequence at the elevating station.

The elevator 34 (FIGS. 4 to 7 inclusive) comprises three slidably interfitted telescopic tubes, the outer of which, 132, is closed at its bottom end to provide a housing shell which is secured in the base platen 70, and in axial alignment with the well 20 of the detection chamber. The innermost one, 134, of the three interfitted tubes has secured at its upper end an elevating head 136 which, as shown particularly in FIGURE 6, is in the form of a gabled cylindrical plug having a diameter slightly less than that of the aperture 90 in the tray. The upper surfaces of the plug are the intercepts of truncating cones, so as to form extensions of the surfaces of the conical chambers 42. Thus, the head terminates in a narrow peak 138 which engages the underside of the sample vial 14 when the elevator 34 is actuated, and the three telescoped shells are secured against relative rotation by interfitted keyways 140 and 142 and set-screw keys 144 and 146 so that the peak 138 of the elevator head is always aligned transversely of the axes of the opposed multiplier photo-tubes. The gabled surfaces of the elevator head are highly polished, so that when they support the sample vial in the detection chamber, they will reflect light emitted from the underside of the sample vial to the faces of the photo-tubes. It may now also be noted that the sides of the sample hood 36 are cut away, as earlier indicated, so as not to screen from the photo-tubes the light reflected from the elevator head 136. The intermediate lobe portions of the upper hood-end retain guiding contact with the sample vial.

The extension of the elevator head 136 is effected by a "folded" screw, i.e., a screw 148 within another screw 150, the two screws being threadedly inter-engaged and the outer screw 150 being threadedly engaged with the innermost tube 134 at its lower end. The inner screw 148 is journalled in the bottom wall of the shell 132 of the elevator mechanism, and has secured to its extending stub portion a drive sprocket 152 connected by means of a lugged belt 154 to a similar drive sprocket 156 on the output shaft of the right-angle drive 158 of a motor 160 mounted on the supporting column 54 of the apparatus. The elevator drive motor is preferably of very durable mechanical construction and is not geared down. Direct drive at the shaft speed of the motor is desired in order to operate the elevating mechanism without undue delay, and its sturdy construction is preferred so that it can be "plugged" to a dead stop without significant overtravel, which might otherwise tend to damage the sample vial 14 on the upstroke of the elevator head 136, or to jam the folded screw 148–150.

Referring particularly to FIGURE 6, it will be seen that the outer shell 132 of the elevator mechanism extends upwardly into the platen 70 flush with the upper surface thereof and at one side of a well 162 formed in the platen. Within the well are secured two micro-switches 164 and 166 which serve as limit stops for operation of the drive motor 160.

The operating leaf of the switch 164 is biased against a plunger pin 168 seated in a bearing hole in the shell 132 with its rounded nose portion in a groove 170 cut in the wall of the intermediate tube 172 of the elevator. The lower end of the groove 170 slopes outwardly to cam the pin 168 outwardly when the tube 172 is extended, and thus to actuate the switch 164. A notch 173 in the plunger head, aligned with groove 170 permits its retraction into the tube without interference from the pin 168.

A similar plunger pin 174 engaged with the operating leaf of switch 166 through an intermediate rock lever 176 serves as the limit on the retraction of the elevator head 136. The inner end of pin 174 rides freely in a groove 178 in the middle tube, being pushed outwardly by contact with a sloped notch 179 on the elevator head 136 to operate the switch 166 upon the retraction of the head into the shell 132.

As already explained, the apparatus is loaded by placing a tray of samples upon the extended telescoping tray rack 18. The tray 12 is then moved backwardly beneath the shield 38, being arrested in operative position by limit stops, not shown, which engage the rear edge of the tray.

One of the adaptor rings 84 is preferably marked as the starting ring, and the sample vials are placed into successive rings beginning with the ring predesignated as the starting ring. Each tray preferably has a capacity of up to one hundred sample vials, adequate to handle most situations, although less than the full number may be used.

Inasmuch as it is desirable to detect and record the radioactivity of the array of samples in order, provision is made to initiate the counting of the samples only after the starting sample, i.e., the sample in the starting ring, has reached the elevating station. This is accomplished by providing one adaptor ring 85 which is higher than all of the others to enable it to operate a switch to convey an appropriate signal when the starting vial is located at the elevating station. By reference to FIGURE 2, it will be noted that a micro-switch 180, conveniently mounted at the rear of the cabinet, is provided at the end of its operating arm with a roller follower positioned to be underpassed by the upper peripheral edge of each adaptor ring 84 as it emerges from the last inwardly folded or re-entrant portion of the track. Only the one odd ring 85, which is located approximately midway through the series and which is higher than the others, is capable of operating the switch. Thus when a new tray of samples is introduced into the machine and the operation initiated, the rings and samples upon the tray continue to index uninterruptedly, and without effect from the micro-switch 130 associated with the one-notch cam 128 on the worm shaft 124, until power to the indexing motor 120 is interrupted by the operation of the micro-switch 180 at the rear of the unit, that micro-switch sensing remotely the presence of the starting sample at the elevating station.

Thereupon the operation progresses automatically according to a predetermined sequence of operations, some of which are, however, individually variable in the manner more fully explained in the aforementioned co-pending application Serial No. 273,499 in order to repeat or foreshorten certain of the operations of the sequence in order to accomplish given objectives.

The sequence itself is controlled by a master programmer which is part of the overall instrument, and is described in detail in the aforesaid co-pending application. It is reproduced here in FIGURE 8, in simplified logic form only in such detail as is necessary to explain the operation of the apparatus herein disclosed.

Referring to the circuit diagram of FIGURE 8 the door 16 of the console, when closed following the introduction of a tray, closes a normally-open micro-switch 182 shown to the left of the console opening in FIGURE 1 to condition certain of the circuitry for operation. The operator then presets into the master programmer 184, by means of controls on the console the available variables in the sequence of operation, and finally closes a starting switch which applies power to all operative circuits, including one to a solenoid latch 186 for locking the console door in closed position. The indexing motor 120 and the drive-engaging solenoid 116 are energized, and as soon as the drive key 104 inserts itself into the keyway in the drive sprocket spindle 92, the adaptor rings 84 and the sample vials contained therein begin to precess until the starting ring arrives at the elevating station, at which time power to the indexing motor 120 is interrupted by the operation of the micro-switch 180 at the rear of the tray.

The driving motor 50 for the sample hood 36 is then energized by the programmer 184 to extend the hood downwardly about the first sample, the hood is indicated at FIGURES 4 and 7, progressing downwardly into near-engagement with the adaptor ring 84 to enshroud the sample vial and to provide a tortuous light path between the tray and the detection chamber. At or near the end of the downward travel of the sample hood the limit of which is determined by the micro-switch 56 at the left of the hood in FIGURE 4, power is directed by the master programmer 184 to the driving motor 160 of the elevator mechanism, causing the elevator head 136 to rise through the aperture 90 in the tray, lifting the vial from the adaptor ring 84, through the guiding hood 36, and into the detection chamber 19, the upward motion being there arrested by the operation of the limit switch 164.

The visible operation of the apparatus then ceases while the master programmer 184 signals the simultaneous operation of all three photo-tubes for a predetermined period of duration, which is variable at the will of the operator within predetermined limits according to the anticipated radioactivity of the sample. In the case of a relatively strong emitter, a shorter period of counting may be ample whereas in the case of a relatively weak emitter it may be desirable to make a longer count. Also, in some instances, as more fully explained in the co-pending application referred to, it may be desirable to foreshorten the period in the detector chamber by rejecting a sample for insufficient activity if its rate of emission in a short initial period of detection is inadequate. Also, as more fully explained in the co-pending application, the dwell of the elevator mechanism 34 at the "up" position, i.e., with a sample in the chamber, may be increased by any preselected multiple of the preselected counting period in order to provide separate multiple counts from the same sample while it remains in the detection chamber.

In any event, upon the completion of the examination of the sample in accordance with preset counting times, or upon its rejection for inadequate activity, the elevator operating motor 160 is energized, through the master and reversing programmer, for rotation in the reverse direction and the elevator mechanism retracted into its housing to return the sample from the detection chamber to its adaptor ring upon the tray. Downward motion is arrested by operation of the limit switch 166. The sample hood 36 is then retracted into the detection chamber by similar reverse rotation of its driving motor, the energization of which is interrupted by the right hand micro-switch 58 when the hood 36 is fully retracted within the chamber. When so retracted, the hood seals off the faces of the photo-tubes from incident light.

Upon the completion of a sequence as just described, the indexing motor 120 is once more energized to move the first sample to the passed position and to present the next sample above the elevator mechanism. The sequence of operations just described is then repeated for the second and all subsequent samples on the tray until all have been examined and counted. This may be all of the maximum of one hundred samples on the tray, or it may be any lesser number of sequences preset into the master program control by the operator in accordance with the number of samples on the tray.

In either event, at the conclusion of the examination of the number of samples for which the master programmer was preset, the master programmer signals a reset program 188 which energizes the index motor 120, shunting the cam-operated one-sample index limit switch 130, until limit switch 180 is operated to signal the return of the starting sample to the elevating station. The master programmer then releases the index drive solenoid 116 and the door latch 186, permitting the door to be opened and the sample tray withdrawn.

From the foregoing, it will be observed that the mounting of the detection chamber above the tray or magazine of samples to be examined provides efficient shielding for the sample while in the detection chamber with a minimum of handling inasmuch as the sample vial is lifted from the tray and inserted into the detection chamber in a single continuous operation, and its removal from the detection chamber and its replacement on the tray or magazine is accomplished by the same single operation in reverse. As it passes to and from the detection chamber, it is guided by the sample hood, which serves when extended to provide a tortuous light path from the idle samples on the tray, so as to effectively insulate the detection chamber from incident light during the counting of the sample, whereas when the hood is retracted after the sample has been withdrawn from the detection chamber, it shields the light sensitive emitting surfaces of the photomultipliers from incident light.

The utilization of the base platen of the apparatus as the evaporator of the refrigeration system places the heat sump within the body of the insulated space and in close proximity to the samples themselves, as well as to the photo-tubes, and the heat conduction from the environment of the photo-tubes is enhanced by the direct conductive relation between the refrigeration platen, the columns which support the shielding tank, and the conduit therein which houses the photomultipliers, thus reducing the time required for the system to attain equilibrium operating temperature.

The overall arrangement, contemplating the introduction of the samples into the detection chamber from the bottom, not only makes the arrangement far more compact than any others heretofore made, but also greatly simplifies the compensation of the counting for incident cosmic radiation by permitting the fixed installation of the cosmic-sensitive luminophor block permanently and in close proximity above the detection chamber.

What is claimed is:

1. Apparatus for detecting the radioactivity of a series of samples each disposed within a light-transmitting container having therein a liquid scintillating medium, comprising a massive radiation shield having therein a vertical well and lateral passages extending into said shield intersecting said well, each said passage being adapted to receive a photodetector instrument in optical communication with said well, a tubular hood reciprocable in said well from a shielding position therein isolating said passages from light-communication with said well to a downwardly extended position exposing said well to said passages, a support beneath said shield adapted to carry thereon a series of sample containers, indexing means for presenting said samples one by one into alignment with and beneath said well in position to be encompassed by said tubular hood when extended, and elevating means for lifting the aligned sample container from said support into said well with the extended hood serving as a guide to direct the sample from said support into said well.

2. Apparatus for detecting the radioactivity of a series of samples each disposed within a light-transmitting container having therein a liquid scintillating medium, comprising a support, means mounted on said support and defining a detection chamber optically coupled to a photosensitive detector, drive means also mounted on said support, a tray with means to receive a plurality of sample containers, propelling means mounted on said tray for simultaneously moving said samples on said tray one after the other through a predetermined path, said predetermined path forming a closed, substantially planar loop, means for removably mounting said tray on said support with said drive means in releasable engagement with said propelling means for actuation thereof and with said predetermined path passing a predetermined station, indexing means mounted on said support for indexing the operation of said drive means to propel said sample containers through said path in discrete increments for successive presentation of said containers at said station in registration therewith, and means on said support for moving a sample container between said station and said detection chamber.

3. Apparatus for detecting the radioactivity of a series of samples each disposed within a light-transmitting container having therein a liquid scintillating medium, comprising a support, means mounted on said support and defining a detection chamber optically coupled to a photosensitive detector, drive means also mounted on said support, a tray having thereon an endless, substantially planar track and a series of drivingly interrelated container holders mounted on said track, propelling means mounted on said tray for driving said container holders about said track, means for removably mounting said tray on said support with said drive means in releasable engagement with said propelling means for activation thereof and with said track passing a predetermined station, indexing means mounted on said support for indexing the operation of said drive means to propel said sample containers about said track in discrete increments for successive presentation of said containers at said station in registration therewith, and means mounted on said support for moving a container between said station and said detection chamber.

(References on following page)

References Cited by the Examiner
UNITED STATES PATENTS

| | | | |
|---|---|---|---|
| 2,843,753 | 7/1958 | Meeder | 250—106 |
| 2,907,881 | 10/1959 | Roucayrol et al. | 250—71.5 |
| 2,924,718 | 2/1960 | Packard et al. | 250—71.5 |
| 3,052,353 | 9/1962 | Pritchett | 250—106 X |
| 3,132,251 | 5/1964 | Maud et al. | 250—108 |

OTHER REFERENCES

"Liquid Scintillation Techniques for Radiocarbon Dating," by R. W. Pringle et al. from "The Review of Scientific Instruments," vol. 26, No 9, September 1955, pp. 859 to 865.

"Counting Suspensions in Liquid Scintillators," by F. N. Hayes et al. from "Nucleonics," volume 14, No. 3, March 1956, pp. 48 to 51.

RALPH G. NILSON, *Primary Examiner.*

W. F. LINDQUIST, *Assistant Examiner.*